United States Patent
Wang

(10) Patent No.: US 7,054,941 B2
(45) Date of Patent: May 30, 2006

(54) METHOD AND NETWORK SYSTEM FOR TRANSFERRING PROGRAMS

(75) Inventor: Chien-Fa Wang, Taipei Hsien (TW)

(73) Assignee: Via Technologies Inc., Taipei Hsien (TW)

(*) Notice: Subject to any disclaimer, the term of this patent is extended or adjusted under 35 U.S.C. 154(b) by 686 days.

(21) Appl. No.: 10/063,884

(22) Filed: May 21, 2002

(65) Prior Publication Data

US 2003/0061314 A1    Mar. 27, 2003

(30) Foreign Application Priority Data

Sep. 21, 2001  (TW) .............................. 90123373 A

(51) Int. Cl.
*G06F 15/16* (2006.01)
(52) U.S. Cl. ........................ 709/228; 709/230; 370/231
(58) Field of Classification Search ................ 709/219, 709/228–229, 230, 233–234, 246; 370/230–235, 370/389, 396–398
See application file for complete search history.

(56) References Cited

U.S. PATENT DOCUMENTS

| | | | | |
|---|---|---|---|---|
| 5,453,987 A * | 9/1995 | Tran | ............................ | 370/447 |
| 5,666,293 A * | 9/1997 | Metz et al. | ................. | 709/220 |
| 5,802,311 A * | 9/1998 | Wronski | ..................... | 709/236 |
| 6,031,818 A * | 2/2000 | Lo et al. | ...................... | 370/216 |
| 6,151,674 A * | 11/2000 | Takatani | ........................ | 713/2 |
| 6,202,091 B1 * | 3/2001 | Godse | .......................... | 709/222 |
| 6,389,016 B1 * | 5/2002 | Sabaa et al. | ................. | 370/389 |
| 6,404,739 B1 * | 6/2002 | Gonno | ......................... | 370/236 |
| 6,405,239 B1 * | 6/2002 | Addington et al. | .......... | 709/203 |
| 6,430,620 B1 * | 8/2002 | Omura et al. | ................ | 709/231 |
| 6,493,871 B1 * | 12/2002 | McGuire et al. | ............. | 717/173 |
| 6,532,591 B1 * | 3/2003 | Arai et al. | ................... | 725/132 |
| 6,748,525 B1 * | 6/2004 | Hubacher et al. | .............. | 713/1 |
| 6,765,885 B1 * | 7/2004 | Jiang et al. | .................. | 370/328 |
| 6,854,009 B1 * | 2/2005 | Hughes | ....................... | 709/220 |

OTHER PUBLICATIONS

Douglas E. Comer, Internetworking with TCP/IP, vol. I, Principles, Protocols, and Architecture, Sect. 13.16, Timeout and Retransmission, pp. 209-211.*

* cited by examiner

*Primary Examiner*—Zarni Maung
*Assistant Examiner*—Van Nguyen
(74) *Attorney, Agent, or Firm*—Winston Hsu

(57) ABSTRACT

A network has a server and a plurality of terminals connected to the server. The terminals are capable of requesting the server to transfer a program. The server responds to the request of the terminals by broadcasting the program to the terminals. The method for transferring the program via the network uses a terminal to request the server to re-transfer the program when the terminal receives only a portion of the program requested by another terminal instead of receiving the complete program during a timeout period. The method and the network system for transferring programs are capable of substantially reducing the transferring time for an operating system and effectively improving the transferring efficiency to overcome the prior art shortcomings.

12 Claims, 4 Drawing Sheets

METHOD AND NETWORK SYSTEM FOR TRANSFERRING PROGRAMS

BACKGROUND OF INVENTION

1. Field of the Invention

The invention relates to a method for transferring programs via a network, and more particularly, to a method for transferring programs according to demands of a plurality of terminals in a network system simultaneously.

2. Description of the Prior Art

In modern society, communications networks such as the Internet enable vast numbers of persons to communicate a virtually limitless variety of information across great distances. The development of the World Wide Web has enabled persons to find and display information in a multimedia format using a network terminal such as a personal computer (PC) or an information appliance (IA). If costs of increasing sophisticated network terminals and network equipment continue to fall, network terminal usage should ideally proliferate to a point of becoming rather ubiquitous and inter-connected. At some time in the future, most people will possess their own terminals and such terminals will become increasingly inter-networked with each other.

One effective way to reduce the costs of the network terminals is to access an operating system required by the network terminals via a network. It is well known by those skilled in the art that an operating system with a considerable size is necessary for a network terminal such as a PC or an IA. When the network terminal is turned on, the operating system is loaded and then executed to provide a program interface such as a graphic user interface for a user to access network information conveniently. In the prior art network terminal, the operating system is stored in a non-volatile memory device in the network terminal, e.g., a hard disk, such that the cost of the network terminal cannot be reduced due to the necessity of the non-volatile memory device. Therefore, the prevalence of using network terminals is impeded.

Please refer to FIG. 1 for illustration of a prior art network booting method. FIG. 1 is a schematic, flow chart of the prior art network booting method used in a network system 10 for transferring an operating system from a server 12 to a terminal 14 via a network 16. The vertical axis in FIG. 1 represents a time scale. It is well known by those skilled in the art that when a file with a considerable size is transferred via a network, the file is divided into a plurality of data packets with a smaller size so as to facilitate the transfer. The description herein assumes that an operating system has been divided into five data packets, i.e. data packets #1 to #5. In fact, more data packets may be generated for the transferred operating system. The terminal 14 is required to receive all of the data packets from the network 16 to combine these five data packets into a completed operating system so as to boot the terminal 14.

When the terminal 14 is turned on, the terminal 14 is ready to load in the operating system via the network 16 in step 14A. The terminal 14 transfers a signal packet 16A to the server 12 for requesting to boot via the network 16. After the server 12 receives the request for booting through the signal packet 16A from the terminal 14, the server 12 responds to the request in step 12A by transferring a first data packet 18A, i.e., the data packet #1, of the operating system via the network 16 to the terminal 14. After the terminal 14 receives the data packet #1 of the operating system in step 20A, the terminal 14 returns a confirmation packet #1 with a confirmation signal to the server 12 so as to notify the server 12 that the terminal 14 has received the data packet #1 of the operating system. After the server 12 receives the confirmation signal, the server 12 transfers the data packet #2 of the operating system to the terminal 14 in step 12B. After the terminal 14 receives the data packet #2, the terminal 14 returns a confirmation packet #2 with a confirmation signal to the server 12 so as to notify the server 12 that the terminal 14 has received the data packet #2 of the operating system.

Accordingly, after the terminal 14 receives a specific data packet of the operating system, the terminal 14 returns a confirmation packet with a confirmation signal to the server 12. Then, after the server 12 receives the confirmation signal from the terminal 14, the server 12 transfers the next data packet of the operating system via the network 16 to the terminal 14. Finally, in step 12E, after the server 12 receives a confirmation signal from the terminal 14 for confirming the data packet #4 of the operating system has been received by the terminal 14, the server 12 transfers the last data packet, i.e., the data packet #5, of the operating system to the terminal 14. After the terminal 14 receives the data packet #5 in step 20E, the terminal 14 returns a confirmation packet #5 to the server 12 so as to notify the server 12 that the terminal 14 has received the data packet #5. After the server 12 receives the confirmation signal from the terminal 14 in step 24, the server 12 realizes that the process of transferring the operating system to the terminal 14 is completed. Thus, this procedure continues to step 14B of combining the data packets #1 to #5 of the operating system into a completed operating system and then executing the operating system so as to boot the terminal 14.

In the prior art, after the server 12 transfers a specific data packet of the operating system to the terminal 14, the server 12 has to wait for the terminal 14 to return a confirmation signal during a timeout period so as to ensure that the terminal 14 does not lose the specific data packet due to a possible transferring accident, such as a jam of the communications network, or an unexpected interruption of transferring. The default timeout period is longer than a transferring period that equals to the duration of transferring the data packet from the server 12 to the terminal 14 plus the duration of returning the confirmation signal from the terminal 14 to the server 12. When the server 12 does not receive the confirmation signal returned from the terminal 14 after the timeout period, the server 12 presumes that the terminal 14 does not receive the data packet of the operating system. Therefore, the server 12 re-transfers the same data packet of the operating system and then waits the confirmation signal returned from the terminal 14. When the server 12 still does not receive the confirmation signal returned from the terminal 14 after another timeout period, the server 12 transfers the same data packet of the operating system repeatedly until the server 12 receives the confirmation signal returned from the terminal 14. Thereafter, the server 12 continues to transfer the next data packet of the operating system to the terminal 14 until the terminal 14 receives the completed operating system.

Although the prior art network booting method can ensure the completion of the transferred operating system, communication between the server 12 and a terminal consumes a huge quantity of time to complete the transfer of the entire operating system. Furthermore, in the prior art, the server 12 transfers all of the data packets of the operating system only to one terminal at a time. When more than two terminals, e.g., five terminals, request the server 12 to transfer the operating system, the server 12 has to transfer all of the data packets of the operating system five times. In addition, the server 12 also has to wait for receipt confirmation signals from the respective terminals. That is, the server 12 has to execute the entire procedure as shown in FIG. 1 while each of the terminals requests the transfer of the operating system.

It is quite obvious that when plenty of terminals request the server 12 to transfer the operating system simultaneously, the server 12 has to take a very long time to sequentially transfer the all data packets of the operating system to the respective terminals. Meanwhile, each of the terminals also has to wait a long time to acquire the completed operating system from the server 12 so as to boot the respective terminal. Unfortunately, the condition of simultaneously booting several terminals on a common network system is frequent. For example, all of terminals in the same office or in the same office building are booted at approximately the same time. Moreover, in a network teaching class of a school, all of terminals in the classroom are also booted at approximately the same time at the beginning of the class. Obviously, at a time when a huge amount of terminals are booted, the prior art network booting method causes the transfer of the operating system to be ineffective and adversely affects the demand of a high-speed network system.

SUMMARY OF INVENTION

It is therefore a primary objective of the claimed invention to provide a method and a network system for transferring programs to solve the above-mentioned problem.

According to the claimed invention, a method for transferring a program via a network is disclosed. The network comprises a server and a plurality of terminals connected to the server. The terminals are capable of requesting the server to transfer the program. The server responds to the request of the terminals by broadcasting the program to the terminals. The method uses a terminal to request the server to retransfer the program when the terminal receives only a portion of the program requested by another terminal instead of receiving the complete program during a timeout period.

It is an advantage of the claimed invention that the method and the network system for transferring programs are capable of substantially reducing the transferring time for an operating system and effectively improving the transferring efficiency to overcome the prior art shortcomings.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
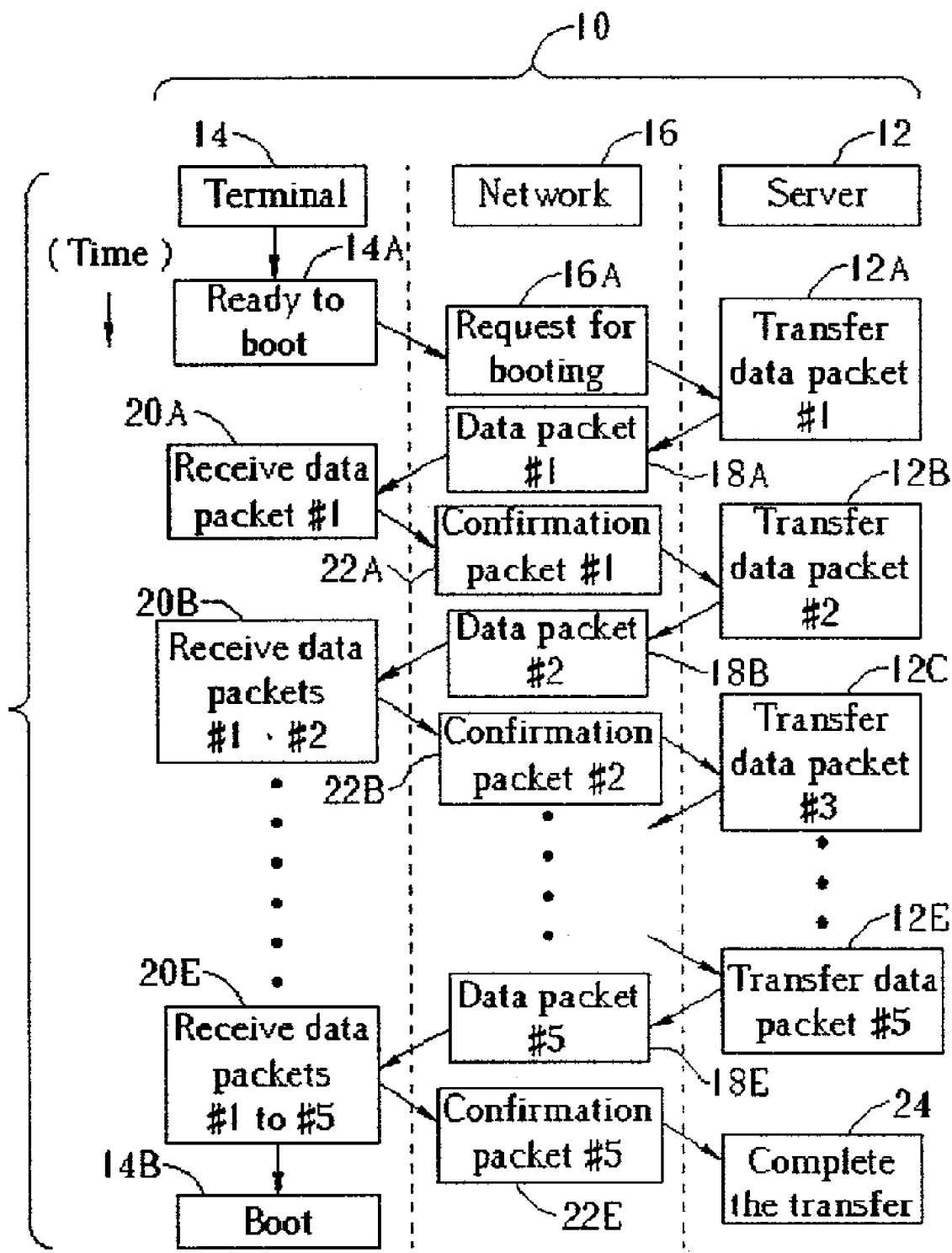
FIG. 1 is a schematic, flow chart of a prior art network booting method used in a network system for transferring an operating system from a server to a terminal via a network.
Figure 2A:
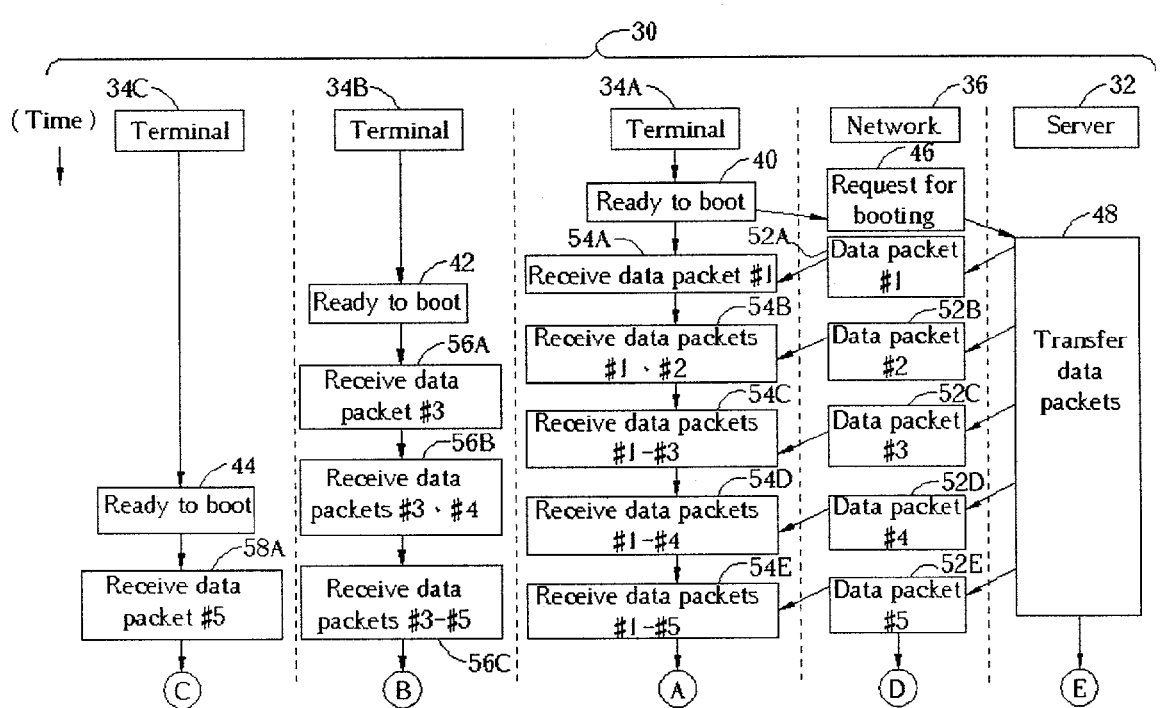
FIGS. 2A and 2B are schematic, flow charts for transferring an operating system according to the present invention.
Figure 2B:
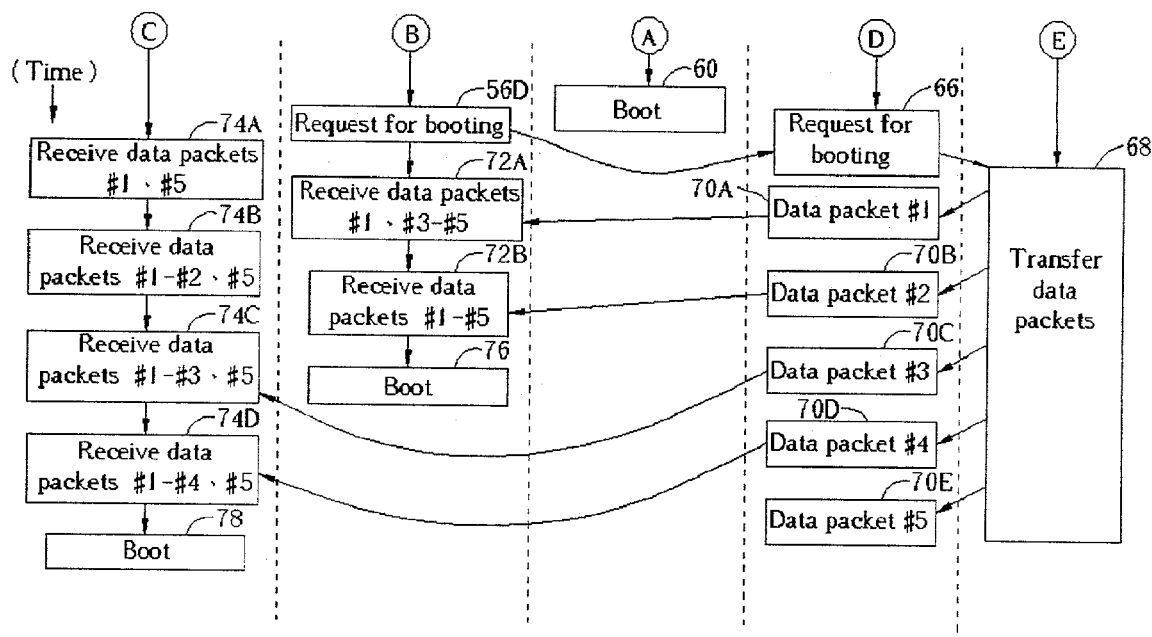

Please refer to FIGS. 2A and 2B. FIGS. 2A and 2B are schematic, flow charts for transferring an operating system according to the present invention. Both of the vertical axes in FIGS. 2A and 2B represent a time scale. For illustrating the procedure of the present invention completely, the flow chart is divided into two figures, that is, FIG. 2A and FIG. 2B. The connective points between FIGS. 2A and 2B are designated as A, B, and C as shown in FIGS. 2A and 2B. To illustrate the suitability of the present invention for being utilized in numerous terminals, the embodiment shown in FIGS. 2A and 2B is assumed to be performed in a network system 30 with at least three terminals 34A, 34B, 34C, such as personal computers or information appliances (IAs). The terminals 34A, 34B, 34C are connected to a server 32 via a network 36. Each of the terminals 34A, 34B, and 34C acquires the operating system from the server 32, and then performs respective booting processes. For comparing the present invention with the prior art conveniently, the operating system is also assumed to be divided into five data packets, that is, data packets #1 to #5.

In FIG. 2A, assuming that the terminal 34A is turned on in step 40, the terminal 34A starts to receive signals on the network 36 to check whether the terminal 34A can receive the data packets of the operating system on the network 36. When the terminal 34A does not receive any one of the data packets of the operating system during a default timeout period, the terminal 34A transfers a signal packet 46 to the server 32 to request for booting in step 40. As for the action of the terminal 34A during the timeout period, the detail description will be disclosed later.

After the server 32 receives the request for booting of the terminal 34A, the server 32 broadcasts the five data packets 52A, 52B, 52C, 52D, 52E, i.e., data packets #1 to #5, of the operating system via the network 36 in step 48. Differing from the prior art, the server 32 of the present invention broadcasts the data packets #1 to #5 of the operating system to the network 36 in a fixed time interval instead of transferring the data packets after receiving confirmation signals returned from the terminals in the prior art. Since all of the terminals connected to the network 36 can receive broadcasted signals on the network 36, when the server 32 broadcasts the data packets of the operating system to the network 36, all of the terminals connected to the network 36 can receive the data packets of the operating system. Furthermore, after the terminals receive the data packets of the operating system, the terminals are not required to return the confirmation signals to the server 32. Finally, the terminal 34A receives all of the data packets #1 to #5 of the operating system in step 54E.

As described previously, the condition of booting several terminals at the approximately same time is common. As shown in FIG. 2A, when the terminal 34A sequentially receives the data packets #1 to #5 of the operating system in steps 54A to 54E, the terminal 34B is turned on in step 42. Similar to the terminal 34A, the terminal 34B starts to receive signals on the network 36 in step 42. Meanwhile, the terminal 34B receives the data packet #3 of the operating system broadcasted on the network 36 in step 56A. Then, in step 56B, the terminal 34B receives the data packet #4 broadcasted from the server 32, thus collecting the two data packets #3 and #4 of the operating system in step 56B. Surely, when the terminal 34B is proceeding in step 56B, the terminal 34A is proceeding in step 54D simultaneously to receive the data packet #4 broadcasted on the network 36.

When the terminal 34B continues to step 56C, the data packets #3 to #5 of the operating system are collected via the network 36. Meanwhile, the terminal 34C is turned on in step 44. Likewise, the terminal 34C starts to receive signals on the network 36 in step 44. Then, the terminal 34C receives the data packet #5 broadcasted on the network 36 from the server 32 in step 58A. Surely, the terminals 34B and 34A receive the data packet #5 of the operating system as well.

Please refer to the connective points A, B, C in FIG. 2B to continue the procedure. In step 54E of FIG. 2A, the terminal 34A has received all of the data packets #1 to #5 of the operating system so that the terminal 34A can combine the data packets #1 to #5 into a completed operating system. Thereafter, the completed operating system is executed in step 60 to boot the terminal 34A. As to the terminal 34B, after receiving the data packets #3 to #5 of the operating system in step 56C, no more data packets of the operating system can be received on the network 36 since the server 32 had broadcasted all of the data packets #1 to #5 of the operating system in step 48 (as shown in FIG. 2A). For the same reason, after the terminal 34C receives the data packet #5 of the operating system in step 58A, no more data packets of the operating system can be received on the network 36 by the terminal 34C.

According to the present invention, when the terminals 34B and 34C receive only a portion of the operating system instead of receiving the complete operating system during a timeout period in steps 56C and 58A respectively, the terminals 34B and 34C request the server 32 to re-transfer the operating system. Assuming that the default timeout period of the terminal 34B is shorter than that of the terminal 34C, then the terminal 34B transfers a signal packet 66 to the server 32 in step 56D to request for booting. For responding to the request for booting of the terminal 34B, the server 32 broadcasts sequentially the data packets 70A to 70E, i.e., the data packets #1 to #5, of the operating system in step 68. As shown in step 48 of FIG. 2A, the server 32 broadcasts the data packets #1 to #5 sequentially in an appropriated time interval instead of transferring the data packet after receiving the confirmation signals from the terminals.

In steps 72A and 72B, the terminal 34B receives the data packets #1 and #2 of the operating system, respectively. In addition to the data packets #3 to #5 collected in step 56A to 56C, the terminal 34B collects all of the data packets #1 to #5 of the operating system, and then executes the completed operating system in step 76. That is, among the data packets received by the terminal 34B, the data packets #3 to #5 are broadcasted by the server 32 for responding to the request of the terminal 34A, whereas the data packets #1 and #2 are broadcasted by the server 32 for responding the request of the terminal 34B.

Likewise, the terminal 34C receives the data packets #2 to #5 of the operating system in steps 74A to 74D, respectively. In addition to the data packet #5 collected in step 58A (as shown in FIG. 2A), the terminal 34C collects all of the data packets #1 to #5 of the operating system, and then executes the completed operating system in step 78. That is, among the data packets received by the terminal 34C, the data packet #5 is broadcasted by the server 32 for responding the request of the terminal 34A, whereas the data packets #1 to #4 are broadcasted by the server 32 for responding the request of the terminal 34B. The terminal 34C even has not requested the server 32 to transfer the operating system after step 44 for turning the terminal 34C on, and can collect all of the data packets #1 to #5 of the operating system to boot the terminal 34C.

In summary, according to the present invention, when a terminal is turned on, the terminal starts to receive signals broadcasted on a network to check whether data packets of an operating system which have been requested by another terminal can be received instead of requesting a server to transfer the data packets of the operating system. When the terminal does not receive the data packets broadcasted by the server during a default timeout period, the terminal requests the server to re-transfer the data packets, as in the situation of the terminal 34A. When the data packets have been broadcasted on the network, the terminal can receive the data packets and collect the data packets in a memory module in the terminal, as shown with the situations of the terminals 34B and 34C in steps 56A and 58A respectively. Whenever the terminal receives a data packet, the terminal waits for a default timeout period to see whether the terminal can receive another data packet of the operating system. When the terminal cannot receive the next data packet of the operating system, the terminal requests to the server to re-transfer the operating system, as shown in the action of the terminal 34B in step 56D.

Figure 3:
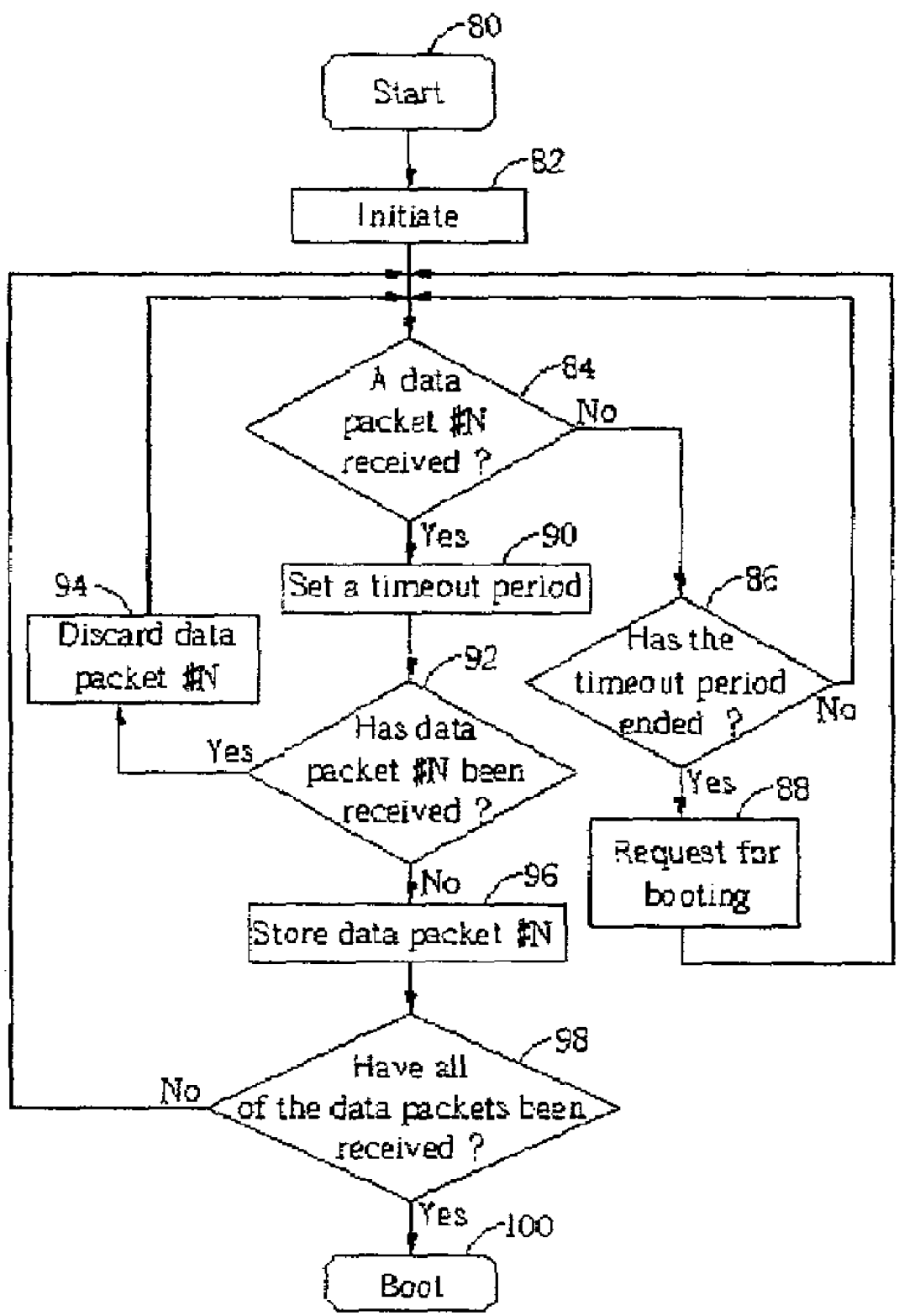
FIG. 3 is a flow chart illustrating a network booting procedure of a terminal according to the present invention.

Please refer to FIG. 3 for detailed description of the procedure for network booting. FIG. 3 is a flow chart illustrating a network booting procedure of a terminal according to the present invention. The procedure comprises the following steps:

step 80:

start; the terminal is turned on so that the terminal is ready to acquire an operating system from a server via a network;

step 82:

initiate to set a default timeout period of the terminal, reset a timer, and allocate a memory area in a memory module, e.g., a random access memory (RAM), of the terminal to store each of data packets of the operating system;

step 84:

receive signals on the network; if the received signals comprise any one of the data packets of the operating system ("data packet #N" shown in FIG. 3 represents any one of the data packets of the operating system instead of the specific data packet), go to step 90, if not, go to step 86;

step 86:

count time; if the time exceeds the default timeout period, go to step 88, if not, go back to step 84 to continue receiving the data packets on the network;

step 88:

request the server to broadcast the data packets of the operating system via the network; then go back to step 84 to continue receiving the data packets of the operating system;

step 90:

adjust the default timeout period dynamically according to the received data packet; then go to step 92;

step 92:

if the received data packet #N had been received by the terminal before, go to step 94, if not, go to step 96; since the broadcasted data packets on the network may be requested by other terminals, the same data packet may be received repeatedly by the terminal;

step 94:

discard the repeated data packet #N;

step 96:

store the data packet #N in the memory allocated in step 82;

step 98:

if all of the data packets of the operating system have been received, go to step 100, if not, go back to step 84 to continue receiving other data packets;

step 100: boot the terminal using the completed operating system.

According to the present invention, the terminal waits a default timeout period to determine whether the terminal actively requests the server to re-transfer the operating system, or passively receives the data packets of the operating system that have been broadcasted on the network. The initial timeout period is set in step 82 of FIG. 3, and adjusted dynamically in step 90. According to an embodiment of the present invention, a server broadcasts data packets of an operating system in a fixed time period of T. Assuming that a transferring time for one data packet being transferred from the server to a terminal is Te, then the initial timeout period set in step 82 equals to T plus Te and plus Tc. The Tc is a safety coefficient with a positive value.

Thereafter, the procedure goes on to step 90, and the terminal has received a data packet #N. Assuming that the data packet with the largest number among the data packets which have not been received by the terminal is data packet #M, then the timeout period is dynamically adjusted as followed: when N is larger than M, then the timeout period is kept the same, whereas, when N is smaller than M, then the timeout period is adjusted to a value which is the larger one between the original timeout period and a value of (M−N)*T+Te+Tc. For matching up the above-mentioned setting method, the data packet with the largest number of the present invention, i.e., the last data packet of the operating system transferred by the server, is marked with a specific sign. The terminal can thus judge whether the received data packet is the data packet with the largest number.

For instance, in FIG. 2A, the terminal 34B starts to receive the data packets of the operating system in step 42. Then, the terminal 34B receives the data packet #3 in step 56A, thus, N equals to 3 in step 84 of FIG. 3. Since the terminal 34B does not know that how many data packets are comprised in the completed operating system, the value of M is assumed to be N+1, i.e., 4. The timeout period is thus set to a value of T+Te+Tc. Thereafter, the procedure goes to step 56C, the terminal 34B receives the data packet #5, i.e., N=5. Since the embodiment in FIGS. 2A and 2B are assumed that the operating system is composed of five data packets, the data packet #5 is the data packet with the largest number and is marker with a specific sign so that the terminal 34B realizes the largest number of the data packet is 5 in step 56C. Meanwhile, the terminal 34B has not received the data packets #1 and #2, thus the largest number of the data packets which have not been received by the terminal 34B is turned into 2, i.e., M=2. Since M is smaller than N (2<5), the timeout period is kept the same, that is, the value of T+Te+Tc, in step 56C.

On the other hand, since the terminal 34C first receives the data packet #5 with the specific sign and has not received the data packets #1 to #4 in step 58A, the M value is set to 4. Thereafter, the procedure goes to step 74A in FIG. 2B, the terminal 34C receives the data packet #1, i.e., N=1, the timeout period is thus set to the value of 3*T+Te+Tc. That is, the terminal 34C will request the server 32 to re-transfer the operating system when the terminal 34C has not received other data packets during the longer timeout period of 3*T+Te+Tc. This longer timeout period prevents the terminal 34C from requesting for booting too early. As shown in the embodiment of FIGS. 2A and 2B, since the server 32 of the present invention utilizes broadcasting to transfer the data packets of the operating system, when plenty of the terminals are turned on at the approximately same time, not all of the terminals are required to request the server 32 to transfer the operating system. Therefore, the method of the present invention can substantially reduce the frequency of the terminals requesting booting, and thus reduce the number of times the server needs to transfer the data packets of the operating system. The network booting efficiency according to the present invention is thus greatly increased, and the load of the server is substantially reduced.

In summary, in the prior art network booting method, when each of terminals requests for booting, the server has to transfer all of the data packets of the operating system to respond to the requests. In addition, after the sever transfers one data packet to a terminal, the server has to wait for a confirmation signal to be returned from the terminal. Thus, the efficiency of the prior art network booting method is reduced. Particularly, when plenty of terminals request the server to transfer the operating system simultaneously, the server has to take a very long time to sequentially transfer the whole data packets of the operating system to the respective terminals. Meanwhile, each of the terminals also has to wait a long time to acquire the completed operating system from the server in turn so as to boot the respective terminal.

In contrast to the prior art, the server according to the present invention broadcasts all of the data packets of the operating system onto the network in a fixed time period. When a terminal is turned on, the terminal first receives the data packets on the network to share the data packets requested by another terminal instead of requesting the server to transfer the operating system. Additionally, after the terminal receives a data packet, the terminal is not required to return a confirmation signal to the server. Once an interruption of the network occurs, the terminal merely waits for the network to recover and then continues to receive the data packets on the network or requests that the server re-transfer the operating system after a timeout period. Since the terminal can share the data packets on the network with other terminals, the method of the present invention is suitable for applying in the condition of several terminals being turned on at approximately the same time. According to the present invention, not only the server can release the load and then reduce the number of times of transferring the operating system, but also the terminals can receive all of the data packets of the operating system during a short time period so as to boot the terminals instantly.

The possible modifications of the present invention can be described as followed. First, the server can utilize different threads to broadcast the data packets of the operating system. Whenever the server is requested to broadcast all of the data packets of the operating system, a new thread is created and initiated. For example, steps 48 and 68 in FIGS. 2A and 2B can use different threads to broadcast the operating system respectively. The utilization efficiency of the network is thus substantially increased. Alternatively, multi-thread broadcasting can be used to parallel transmit packets of several "copies" of the operating system so as to further speed the disclosed process.

Furthermore, terminals on the network can be classified into several different groups depending on the operating systems used by the terminals. That is, each of the groups utilizes the same type of the operating system. Thus, the range of each broadcast of the server can be restricted into some specific terminals belonging to the same group. When the server responds to a request of a specific terminal in a specific group, the server broadcasts the data packets of the specific operating system to all of the terminals in the same specific group. For example, terminals in a community network or in a local area network of a company can be classified into several groups with different types, which have different software and hardware architectures. When the terminals in the same group are turned on according to the spirit of the present invention, the server can broadcast the same operating system to the same type terminals so as to boot the terminals in the same group rapidly to achieve the effect of the present invention.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for transferring a program via a network, the network comprising a server and a plurality of terminals connected to the server, the terminals being capable of requesting the server to transfer the program, the server responding to the request of the terminals by broadcasting the program to the terminals, the method comprising:

using a terminal to request the server to re-transfer the program when the terminal receives only a portion of the program requested by another terminal instead of receiving the complete program during a timeout period; and dynamically adjusting the timeout period of the terminal according to which portion of the program has been received by the terminal;

wherein the server divides the program into a plurality of data packets, the server transferring the program using the data packets;

wherein the server sequentially numbers and broadcasts the data packets in the sequentially numbered order, and the timeout period of the terminal is dynamically adjusted according to the difference between the number of the highest numbered data packet not yet received by the terminal and the number of the received data packet.

2. The method of claim 1 wherein the program is an operating system for the terminals.

3. The method of claim 1 wherein when the server receives the request of the terminal, the server enables a thread to broadcast the program.

4. The method of claim 1 wherein each of the data packets has the same size.

5. The method of claim 1 wherein the server broadcasts the data packets sequentially in a fixed time interval.

6. The method of claim 1 wherein the terminals are information appliances (IAs).

7. A network system comprising:

a server; and a plurality of terminals connected to the server, the terminals being capable of requesting the server to transfer a program, the server responding to the request of the terminals by broadcasting the program to the terminals;

wherein when a terminal receives only a portion of the program requested by another terminal instead of receiving the complete program during a timeout period, the terminal will request the server to re-transfer the program, the timeout period of the terminal being dynamically adjusted according to which portion of the program has been received by the terminal;

wherein the server divides the program into a plurality of data packets, the server transferring the program using the data packets;

wherein the server sequentially numbers and broadcasts the data packets in the sequentially numbered order, and the timeout period of the terminal is dynamically adjusted according to the difference between the number of the highest numbered data packet not yet received by the terminal and the number of the received data packet.

8. The network system of claim 7 wherein the program is an operating system for the terminals.

9. The network system of claim 7 wherein when the server receives the request of the terminal, the server enables a thread to broadcast the program.

10. The network system of claim 7 wherein each of the data packets has the same size.

11. The network system of claim 7 wherein the server broadcasts the data packets sequentially in a fixed time interval.

12. The network system of claim 7 wherein the terminals are information appliances (IAs).

* * * * *